United States Patent
Ito (10) Patent No.: US 8,115,738 B2
(45) Date of Patent: Feb. 14, 2012

(54) POSITION DETECTING APPARATUS, POSITION INPUTTING APPARATUS, AND COMPUTER INCLUDING THE SAME

(75) Inventor: Masamitsu Ito, Saitama-ken (JP)

(73) Assignee: Wacom Co., Ltd., Saitama-Ken (JP)

( * ) Notice: Subject to any disclaimer, the term of this patent is extended or adjusted under 35 U.S.C. 154(b) by 1369 days.

(21) Appl. No.: 11/723,200

(22) Filed: Mar. 16, 2007

(65) Prior Publication Data

US 2008/0225011 A1 Sep. 18, 2008

(30) Foreign Application Priority Data

Mar. 16, 2006 (JP) ................................. 2006-073101

(51) Int. Cl.
*G06F 3/041* (2006.01)
*G06K 11/06* (2006.01)
*G08C 21/00* (2006.01)

(52) U.S. Cl. ....................... 345/173; 345/156; 178/18.01
(58) Field of Classification Search .................. 345/156, 345/173–178; 178/18.01–18.07
See application file for complete search history.

(56) References Cited

U.S. PATENT DOCUMENTS 5,949,501 A * 9/1999 Izuno et al. ..................... 349/23

* cited by examiner

*Primary Examiner* — Srilakshmi K Kumar
(74) *Attorney, Agent, or Firm* — Berenato & White, LLC (57) ABSTRACT

A position detecting apparatus includes a display apparatus having a screen for displaying images by changing states of a plurality of display elements arrayed in the screen along a predetermined direction which is parallel to a side boundary of the screen, and at least one detecting conductor disposed on the display apparatus to detect a position indicated on the display apparatus. The at least one detecting conductor is a loop coil having short sides and long sides, the long sides of the loop coil being arranged so as to cross the predetermined direction of the display elements.

29 Claims, 5 Drawing Sheets

2: DISPLAY APPARATUS

100: POSITION DETECTING APPARATUS

104: STORAGE UNIT

105: INPUT UNIT

106: DISPLAY UNIT

POSITION DETECTING APPARATUS, POSITION INPUTTING APPARATUS, AND COMPUTER INCLUDING THE SAME

CROSS REFERENCES TO RELATED APPLICATIONS

The present application claims the benefit of priority from Japanese Application No. P2006-073101 filed on Mar. 16, 2006, the disclosure of which is incorporated herein by reference in its entirety.

FIELD OF THE INVENTION

The present invention relates to a position detecting apparatus, a position inputting apparatus, and a computer suitable for use in directly inputting position information from a display apparatus. More specifically, the present invention relates to a position detecting apparatus, a position inputting apparatus, and a computer capable of preventing problems associated with interference patterns from being produced on a display even when a display apparatus and the position detecting apparatus are combined.

BACKGROUND OF THE INVENTION

A conventional position detecting apparatus provided with a display apparatus is described in Japanese Published Patent Application No. 2002-215317. The conventional position detecting apparatus is an electromagnetic induction system and is located at a back side of the display apparatus.

Additionally, Japanese Published Patent Application No. 11-110115 describes another conventional position detecting apparatus, which is an electrostatic coupling system, provided with a display apparatus. In order to decrease moiré generated when a detection conductor of the position detecting apparatus is provided on a display side of the display apparatus, detection electrodes of the electrostatic coupling system are typically formed on the display side as broken-line like detection electrodes.

When the electromagnetic induction system position detecting apparatus is used with the display apparatus, the position detecting apparatus is typically located at the back side of the display apparatus. On the other hand, when the electrostatic coupling system position detecting apparatus is used, the detection conductor (i.e., detection electrodes) of the position detecting apparatus is formed as a broken-line shape and is typically located at the display side of the display apparatus.

An apparatus that detects a designated position on a board called a "tablet/digitizer" and an input apparatus that inputs position information are widely used with computers. The tablet/digitizer uses the position detecting apparatus to detect the designated position. Although various technologies have been developed for detecting the position designated on the board, the position detecting apparatus that uses the electromagnetic induction system has been found extremely effective, because the electromagnetic induction system position detecting apparatus is high in detection accuracy and reliability.

Additionally, an apparatus in which a thin display apparatus (e.g., a liquid crystal display) and a tablet/digitizer are integrally formed as one body have been developed. In this case, a screen of the display apparatus is the surface of the board (i.e., the tablet/digitizer). When using the electromagnetic induction system position detecting apparatus, since the designated position of an indicating device can be detected even when the indicating device and the surface of the board are spaced apart, the position detecting apparatus is typically provided at the back side of the display apparatus.

However, when the position detecting apparatus is provided at the back side of the display apparatus, the position detecting apparatus restricts a design of the display apparatus and location of a driving circuit for the display apparatus located at the back side of the position detecting apparatus. That is, when the position detecting apparatus is attached to the back side of the display apparatus later on (e.g., after manufacturing the display apparatus and the driving circuit), a large number of conditions are imposed upon the design and specification of the display apparatus (e.g., the placement of the driving circuit on the display apparatus).

On the other hand, a detecting portion of the position detecting apparatus can be formed on a transparent substrate such that the transparent substrate is provided on the display side of the display apparatus. According to this arrangement, conditions and restrictions imposed upon the design and specification of the display apparatus can be minimized substantially. However, since the detecting portion of the electromagnetic induction system position detecting apparatus typically requires a large number of detecting conductors, when the position detecting apparatus is disposed on the display side of the display apparatus, a moiré pattern(s) occurs between an arrangement of display elements (e.g., pixels) of the display apparatus and the detecting conductors of the detecting portion. The moiré pattern(s) causes interference and viewing problems on the display apparatus.

SUMMARY OF THE INVENTION

In order to solve the foregoing and/or other problems, the present invention provides a position detecting apparatus, a position inputting apparatus, and a computer having a display apparatus combined with the position detecting apparatus and/or the position inputting apparatus.

The present invention also provides a display apparatus for displaying images by changing states of a plurality of display elements arrayed in a predetermined direction and a position detecting apparatus combined with the display apparatus for detecting a position indicated on the display apparatus, in which even when a plurality of loop coils is located close to the display apparatus, it is possible to prevent problems associated with interference and a moiré pattern(s) from being produced on the display apparatus.

Additional aspects and advantages of the present invention will be set forth in part in the description which follows and, in part, will be obvious from the description, or may be learned by practice of the invention.

The foregoing and/or other aspects and advantages of the present invention are achieved by providing a position detecting apparatus which includes a display apparatus having a screen for displaying images by changing states of a plurality of display elements arrayed in the screen along a predetermined direction which is parallel to a side boundary of the screen, and at least one detecting conductor disposed on the display apparatus to detect a position indicated on the display apparatus. The at least one detecting conductor is a loop coil having short sides and long sides, and the long sides of the loop coil are arranged so as to cross the predetermined direction of the display elements.

The short sides of the detecting conductor may be located outside the screen of the display apparatus.

The loop coil may include a plurality of loop coils being disposed along a display side of the display apparatus.

The plurality of loop coils may have wirings, which form the long sides of the detecting conductor. The wirings may be disposed at equal intervals on the screen of the display apparatus.

The plurality of loop coils may be disposed on the screen of the display apparatus in an overlapping fashion.

The plurality of loop coils may be formed of a coil having multiple wirings, and each of the loop coils may be formed of a plurality of turns. The multiple wirings form the long side of the loop coils and are disposed on the screen of the display apparatus at equal intervals.

The position detecting apparatus may further include an indicating device to indicate the position on the display apparatus. The indicated position may be detected by selecting at least one of the loop coils, transmitting transmission signals from the selected loop coils to the indicating device, and calculating levels of signals of the transmission signals received by the indicating device.

The indicated position may alternatively be detected by transmitting transmission signals from said indicating device to the plurality of loop coils and calculating levels of the transmission signals received from the indicating device by each of the plurality of loop coils.

The indicated position may alternatively be detected by selecting ones of the loop coils to transmit first transmission signals to the indicating device, transmitting second transmission signals from the indicating device to the plurality of loop coils in response to the first transmission signals, and calculating levels of the second transmission signals received by each of the plurality of loop coils from the indicating device.

The plurality of loop coils may include a first loop coil group and a second loop coil group. The long sides of the first and second loop coil groups cross each other and cross the predetermined direction of the display elements.

The foregoing and/or other aspects and advantages of the present invention are also achieved by providing a position inputting apparatus which includes a display apparatus having a screen for displaying images by changing states of a plurality of display elements arrayed in the screen along a predetermined direction which is parallel to a side boundary of the screen, and at least one detecting conductor disposed on the display apparatus to detect a position indicated on the display apparatus and to input position information. The at least one detecting conductor is a loop coil having short sides and long sides, and the long sides of the loop coil are arranged so as to cross the predetermined direction of the display elements.

The foregoing and/or other aspects and advantages of the present invention are also achieved by providing a computer which includes a display apparatus having a screen for displaying images by changing states of a plurality of display elements arrayed in the screen along a predetermined direction which is parallel to a side boundary of the screen, and a position detecting apparatus disposed on the display apparatus to detect a position indicated on the display apparatus. The position detecting apparatus includes at least one detecting conductor disposed on the display apparatus which is a loop coil having short sides and long sides. The long sides of the loop coil are arranged so as to cross the predetermined direction of the display elements.

The foregoing and/or other aspects and advantages of the present invention are also achieved by providing a position detecting apparatus, including a display panel having a rectangular screen with a plurality of pixels, and a position input device being removably coupled with the display panel. The position input device includes a position detecting grid disposed on the screen of the display panel and having a plurality of elongated conductors spaced apart from each other and extending diagonally with respect to lengthwise and widthwise axes of the screen, a coupling part to removably couple the position detecting grid to the display panel, and a control part to control the position detecting grid to detect a position indicated on the screen.

The foregoing and/or other aspects and advantages of the present invention are also achieved by providing a position detecting apparatus, including a rectangular position detecting grid having at least first and second groups of elongated conductors extending diagonally across the grid in first and second directions, respectively. The position detecting grid is couplable to a display side of a display panel that displays images.

The foregoing and/or other aspects and advantages of the present invention are also achieved by providing a computer, including a display panel to display images on a display side thereof, a central processing unit to control the display panel, and a position detecting apparatus. The position detecting apparatus includes a rectangular position detecting grid coupled to the display side of the display panel and having at least first and second groups of elongated conductors extending diagonally across the grid in first and second directions, respectively, and a control part to determine a position of a movable indicator with respect to the position detecting grid based on communication signals exchanged between the elongated conductors and the movable indicator. The computer further includes an input part to receive the determined position of the movable indicator from the control part of the position detecting apparatus and to provide the determined position to the central processing unit.

The foregoing and/or other aspects and advantages of the present invention are also achieved by providing a method of detecting a position of a movable indicator with respect to a display apparatus having a rectangular screen. The method includes providing a position detecting grid on a display side of the display apparatus, the position detecting grid having a plurality of elongated conductors spaced apart from each other and extending diagonally with respect to lengthwise and widthwise axes of the rectangular screen of the display apparatus, controlling the elongated conductors to exchange communication signals with the movable indicator, and determining an elongated conductor closest to the movable indicator based on a comparison of communication signals exchanged by the corresponding elongated conductors.

According to the position detecting apparatus, the position inputting apparatus and the computer described above, the display apparatus and the position detecting apparatus can be combined to operate in a satisfactory manner. Also, even when a plurality of loop coils are located close to the display apparatus, it is possible to prevent problems associated with interference and a moiré pattern(s) from being produced on the display apparatus. As a result, quality of images on the display apparatus are not compromised by the loop coils.

BRIEF DESCRIPTION OF THE DRAWINGS

The accompanying drawings are incorporated in and constitute a part of the specification. The drawings, together with the general description given above and the detailed description of the embodiments and methods given below, serve to explain the principles of the invention. In such drawings.

DETAILED DESCRIPTION OF THE EMBODIMENTS

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the embodiments and methods. The invention according to its various aspects is particularly pointed out and distinctly claimed in the attached claims read in view of this specification, and appropriate equivalents.

Figure 1:
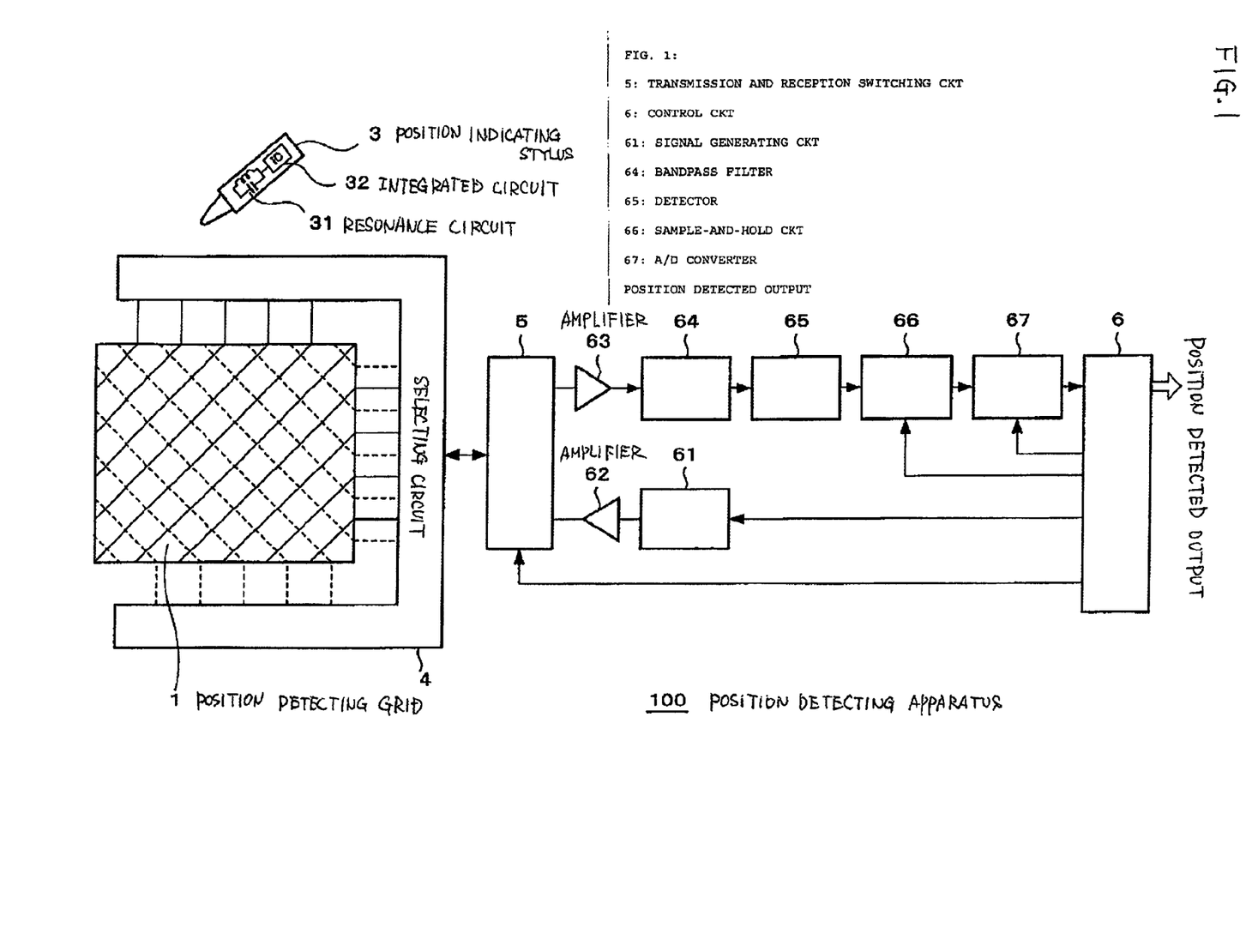
FIG. 1 is a block diagram illustrating a position detecting apparatus according to an embodiment of the present invention.

FIG. 1 illustrates a position detecting apparatus 100 according to an embodiment of the present invention.

The position detecting apparatus 100 includes a position detecting grid 1 which is schematically illustrated at a left-hand side of FIG. 1. Although a display apparatus is not illustrated in FIG. 1, it should be understood that display elements of the display apparatus can be arrayed in the horizontal and vertical directions with respect to the position detecting grid 1. That is, the display elements (e.g., pixels) are arrayed along a lengthwise axis and widthwise axis of a screen of the display apparatus.

The loop coils of the position detecting grid 1, which are depicted by the diagonal solid and broken lines in the position detecting grid 1, create electromagnetic induction. The position detecting grid 1 illustrated in FIG. 1 is provided in such a manner that long sides of loop coils (illustrated only by lines in FIG. 1) are arranged along an oblique direction (i.e., a slanting direction(s)) which crosses the horizontal and vertical directions along which the display elements of the display apparatus are arranged. Solid lines and broken lines in the position detecting grid 1 illustrated in FIG. 1 respectively represent loop coils of different layers. These loop coils of different layers are arranged so as to cross each other.

When the position detecting grid 1 is in use, a position indicating stylus 3 having a resonance circuit 31 housed therein can be moved close to the position detecting grid 1 such that the resonance circuit 31 housed within the position indicating stylus 3 is driven by an alternating field signal with a specific frequency transmitted from the position detecting grid 1. A resonance signal output from the resonance circuit 31 in response to the alternating field signal is received by the position detecting grid 1. It should be noted that corresponding code information can be inserted into this resonance signal by an integrated circuit (IC) 32 connected to the resonance circuit 31. However, this integrated circuit (IC) 32 may not always be necessary.

Accordingly, the position detecting grid 1 includes a mechanism for transmitting the alternating field signal described above and a mechanism for receiving the resonance signal output by the resonance circuit 31.

More specifically, in the position detecting grid 1, an end portion of one loop coil provided in the slanting direction(s) is connected to a selecting circuit 4. The selecting circuit 4 performs a selection operation to sequentially scan each one of the loop coils, and the selecting circuit 4 can also select the respective layers of the loop coils in the position detecting grid 1 illustrated by the solid lines and the broken lines in FIG. 1. A transmission and reception switching circuit 5 of the position detecting apparatus 100 is connected to the selecting circuit 4. The transmission and reception switching circuit 5 is adapted to switch between transmission of the alternating field signal described above and reception of the resonance signal output by the resonance circuit 31.

The transmission and reception switching circuit 5 switches between transmission of the alternating field signal and reception of the resonance signal in accordance with a control signal supplied by a control circuit 6. Also, a transmission signal with a specific frequency provided by a signal generating circuit 61, which is operated under control of the control circuit 6, is supplied via an amplifier 62 to the transmission and reception switching circuit 5 and it is further supplied to the selecting circuit 4. The transmission signal is then provided to a loop coil of the position detecting grid 1 selected by the sequential scanning of the selecting circuit 4 such that the alternating field signal is transmitted by the selected loop coil in response to the transmission signal from the signal generating circuit 61.

Further, the resonance circuit 31 disposed within the position indicating stylus 3 is driven by this alternating field signal such that the resonance signal is produced in response to the alternating field signal. The resonance signal produced by the resonance circuit 31 is then received by the position detecting grid 1. The received resonance signal is output through the selecting circuit 4 and the transmission and reception switching circuit 5. More particularly, the received resonance signal is provided by the transmission and reception switching circuit 5 through an amplifier 63 to a bandpass filter (BPF) 64 which passes a portion of the received resonance signal having the specific frequency described above. The portion of the received resonance signal that is passed by the bandpass filter 64 is then supplied to a detector 65. A signal detected by the detector 65 is supplied through a sample-and-hold (S/H) circuit 66 to an analog-to-digital (A/D) converter 67, in which it is converted from an analog signal to a digital signal. The converted digital signal is then provided to the control circuit 6.

In this manner, the resonance signal received by the position detecting grid 1 from the resonance circuit 31 of the position indicating stylus 3, which is close to the position detecting grid 1, is digitally converted by the A/D converter 67 and input to the control circuit 6. Based on this digital signal, the control circuit 6 can determine a location of the position indicating stylus 3 relative to the position detecting grid 1.

It should be noted that reception at the position detecting grid 1 is performed at every loop coil selected by the sequential scanning of the selecting circuit 4 in order to compare signal levels received at each loop coil. That is, the control circuit 6 may receive digital signals associated with each loop coil. Accordingly, the signals obtained at the various loop coils in response to the resonance signal received from the position indicating stylus 3 are output from each of the sequentially selected loop coils of the position detecting grid 1. These signals output from the corresponding loop coils indicate to which loop coil(s) the position indicating stylus 3 is opposite and/or the adjacent (i.e., which loop coils are closest to the position indicating stylus 3).

It should be noted that the selecting circuit 4 can perform the sequential selecting operation when the loop coils of the position detecting grid 1 are transmitting and/or when the loop coils of the position detecting grid 1 are receiving such that the position indicating stylus 3 can communicate with the selected loop coils at any given time.

Accordingly, the control circuit 6, which receives the signal that is digitally converted from the resonance signal received at the position detecting grid 1, may select the signal having the highest reception level from among the signals received at the plurality of loop coils of the position detecting grid 1. Accordingly, the control circuit 6 determines that the position indicating stylus 3 is opposite and/or adjacent to a center of the loop coil which receives the signal of the highest reception level.

Alternatively, the control circuit 6 may perform various processes to simulate changes of levels of the signals received at the plurality of loop coils, to calculate the position at which the level of the received signal is maximized (i.e., the loop coil having the highest reception level), and to determine that the calculated position should be the position opposite and/or adjacent to the position indicating stylus 3. In this manner, a position detected can be output from the control circuit 6.

In the present embodiment of the position detecting apparatus 100 of the electromagnetic induction system, the position of the display apparatus indicated by an indicating device (e.g., the position indicating stylus 3) can be detected in such a manner that the plurality of loop coils are selected to transmit signals, the signals are received by the indicating device (e.g., the position indicating stylus 3), and a response signal is transmitted from the indicating device and received by the same loop coil(s) or by a different loop coil(s) of the position detecting grid 1. The level(s) of the signal(s) received by the position detecting grid 1 may then be calculated. Additionally, it should be understood that the present embodiment of the invention can be applied to position detection in other types of systems.

More specifically, according to another embodiment of the present invention, a position of the display apparatus indicated by the indicating device (e.g., the position indicating stylus 3) can be detected in such a manner that a plurality of loop coils are selected to transmit signals and the level of the signal(s) received at the indicating device (e.g., the position indicating stylus 3) may be calculated. In this case, a cable (not illustrated) may extend from the position indicating stylus 3 illustrated in FIG. 1, and a signal from the cable may be supplied to the amplifier 63. As a result, it is possible to detect the position indicated on the display apparatus by calculating the level of the signal received by the indicating device (e.g., position indicating stylus 3).

Alternatively, according to yet another embodiment of the present invention, the position indicated on the display apparatus may be detected in such a manner that the signal transmitted from an indicating device (e.g., the position indicating stylus 3) may be received at a plurality of loop coils, and the levels of the signals received at each of the loop coils may be calculated. In this case, a power supply such as a battery may be provided within the position indicating stylus 3 illustrated in FIG. 1. A cable (not illustrated) extending from the amplifier 62 may be connected to the position indicating stylus 3 to supply the transmission signal from the signal generating circuit 61 to the position indicating stylus 3. As a result, the signal transmitted from the indicating device (e.g., the position indicating stylus 3) may be received at the position detecting grid 1 and the indicated position can be detected by calculating the levels of the signals received at each of the loop coils.

Further, in the present embodiment of the invention, when the opposing position of the position indicating stylus 3 is detected by the loop coils of the different layers that cross over each other as illustrated by the solid lines and the broken lines in FIG. 1, two-dimensional coordinates that specify a position of the position indicating stylus 3 can be obtained. In this case, however, since the respective loop coils of the position detecting grid 1 are provided in the slanting direction (s) relative to a direction in which a plurality of display elements that constitute the display apparatus are arrayed, conversion processing for converting positions of these display elements and loop coils into X-Y coordinates along the vertical axis and the horizontal axis is performed by the control circuit 6. It should be noted that this conversion can be performed by a numerical table or by other methods. Here, the control circuit 6 can convert two dimensional coordinates defined by an orientation of the loop coils to coordinates defined by an orientation of the display elements. For example, if the control circuit 6 determines that the position indicating stylus 3 is closest to an intersection of two loop coils, the controls circuit 6 then determines the display element (e.g., a pixel or group of pixels) located closest to the intersection as being the display element closest to the position indicating stylus 3. Accordingly, the control circuit 6 can determine the display element(s) to which the indicating device is closest.

Also, in the present embodiment of the invention, since the respective loop coils of the position detecting grid 1 are provided in the slanting direction relative to the direction in which the plurality of display elements that constitute the display apparatus are arrayed (i.e., diagonal with respect to the X-Y or horizontal/vertical directions of the screen of the display apparatus), the size of each loop coil is reduced in the four corners of the screen and an area is not uniform. Additionally, the long sides of the loop coils may be arranged to diagonally extend between adjacent pairs of display elements.

Figure 2:
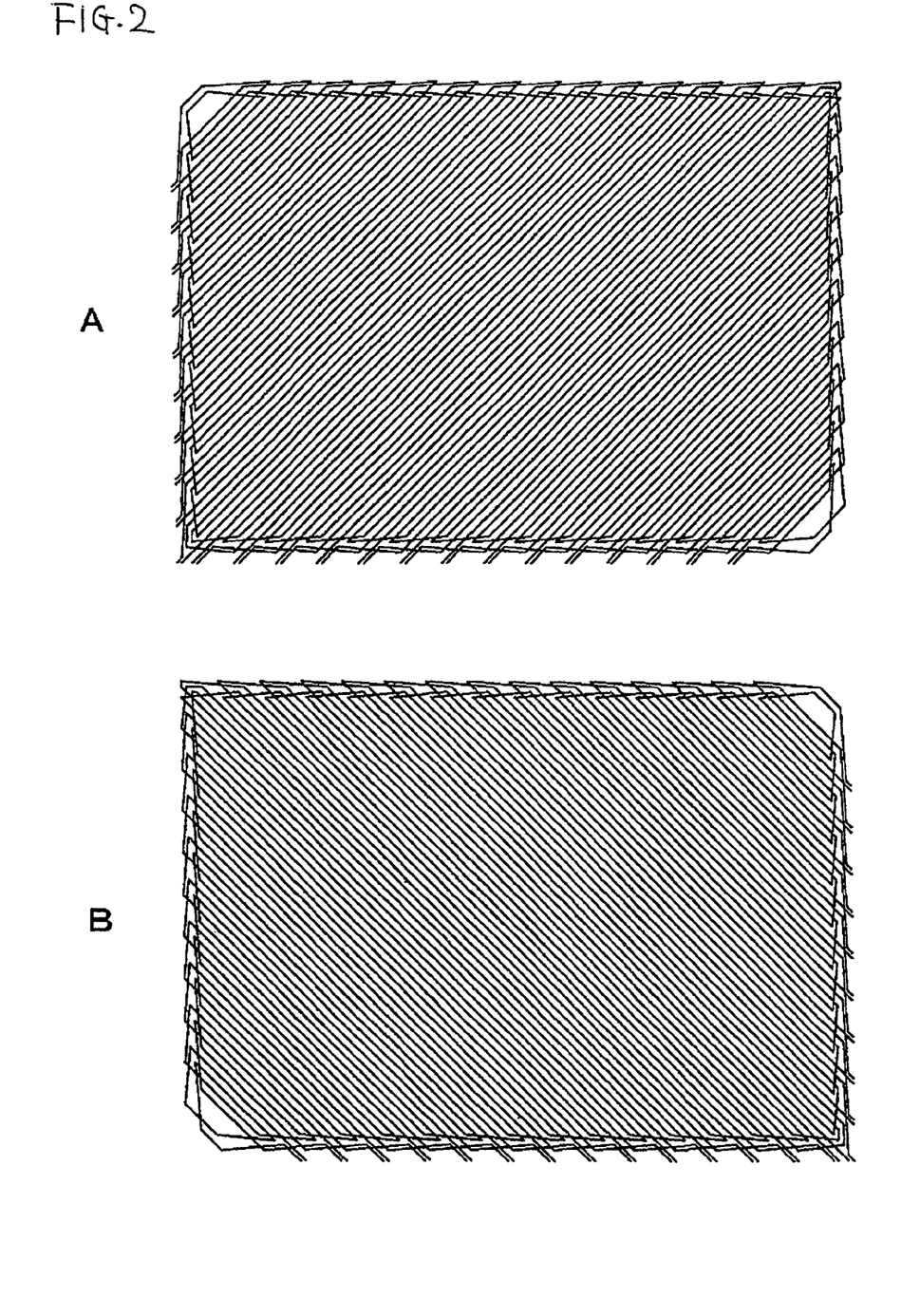
FIGS. 2A and 2B are schematic diagrams illustrating exemplary arrangements of loop coils of a position detecting grid of the position detecting apparatus of FIG. 1, according to an embodiment of the present invention.

FIGS. 2A and 2B illustrate exemplary arrangements of the loop coils of the position detecting grid 1 of the position detecting apparatus 100 of FIG. 1. It should be noted that FIGS. 2A and 2B illustrate coils of respective layers of coils provided in two different layers. The position detecting grid 1 may be formed by laminating the coils of respective layers illustrated in FIGS. 2A and 2B.

However, it should also be understood that the actual number of the loop coils may be greater than the number of loop coils illustrated in FIGS. 2A and 2B. The actual number of the loop coils may be determined based on the number of pixels of the display apparatus such that a detection conductor of each loop coil may be inserted into a gap between adjacent pixels. Accordingly, long sides of these detection conductors may be provided in parallel to each other spaced apart by an equal interval such that the long sides of the detection conductors cross between pixels of different rows and columns of pixels on the screen. Also, while a plurality of loop coils may be disposed in an overlapping fashion as illustrated in FIGS. 2A and 2B, if these overlapping portions are omitted, then an arrangement of each loop coil appears as illustrated in FIGS. 3A and 3B.

Figure 3:
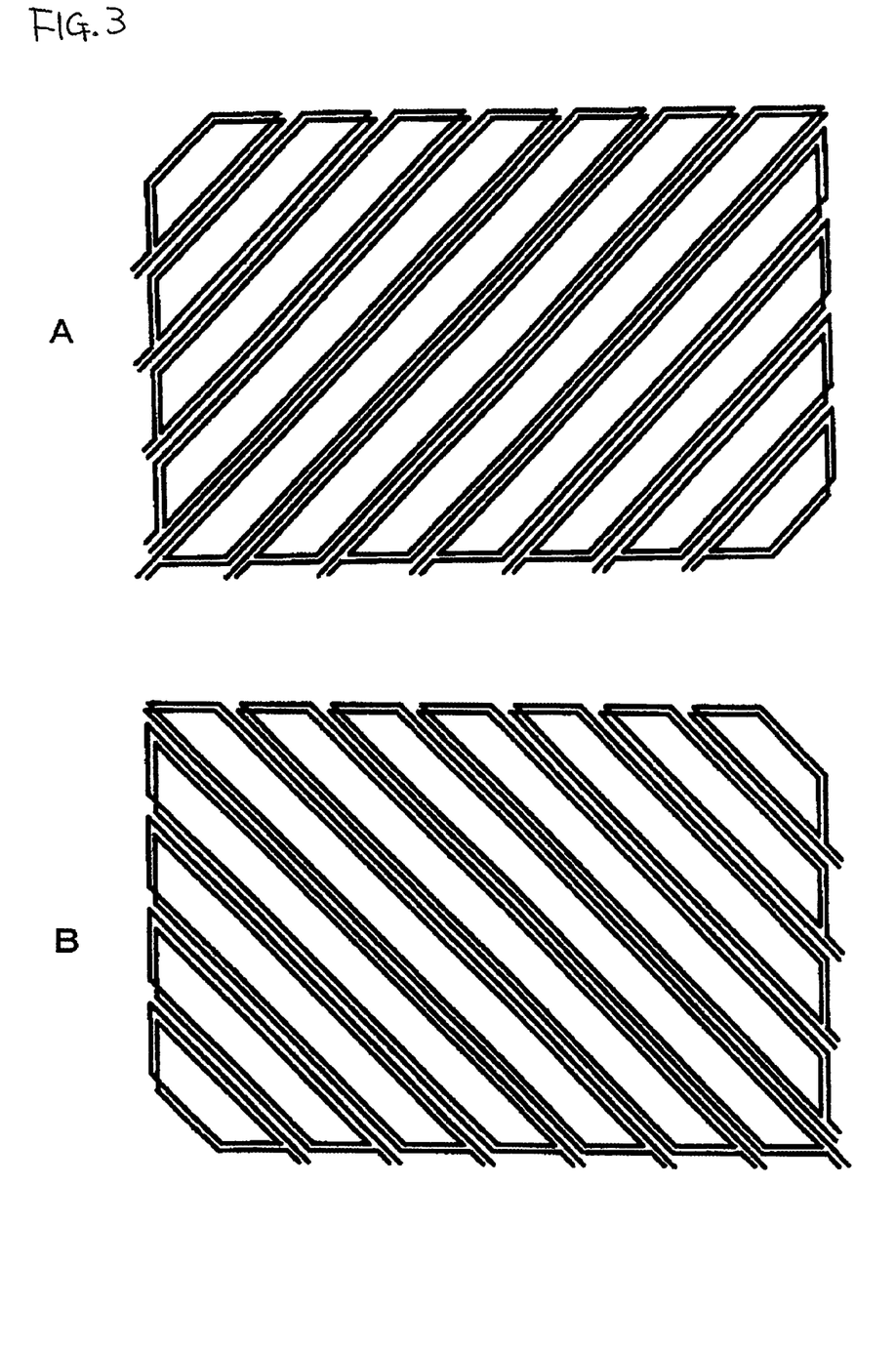
FIGS. 3A and 3B are schematic diagrams illustrating exemplary arrangements of loop coils of a position detecting grid of the position detecting apparatus of FIG. 1, according to another embodiment of the present invention.

FIGS. 3A and 3B are schematic diagrams illustrating exemplary arrangements of loop coils of the position detecting grid 1 of the position detecting apparatus 100 of FIG. 1, according to another embodiment of the present invention. As can be seen in FIGS. 3A and 3B, each loop coil has an opening of a trapezoid or parallelogram shape and the size of this opening is reduced in the four corners of the display screen. In this case, it may be considered that detection sensitivity based on electromagnetic induction varies with the size of the loop coil. In particular, the change in the detection sensitivity is proportional to a change in the area of the loop coil. Thus, if the shape of each loop coil of the position detecting grid 1 is fixed, then it is possible to specify a ratio of the change of detection sensitivity in advance. Accordingly, the change in the detection sensitivity can be easily corrected.

As described above with reference to the position detecting apparatus 100 of FIG. 1, even when the long sides of the loop coils which serve as the detection conductors are provided so as to cross a predetermined direction in which the display elements of the display apparatus are arrayed, it is possible to easily detect the opposing position of the position indicating stylus 3. Consequently, it is possible to dispose the electromagnetic induction system position detecting apparatus, which is extremely high in detection accuracy and reliability, along the display apparatus.

Also, when the detecting portion (e.g., the position detecting grid 1) of the position detecting apparatus 100 is formed on a transparent substrate, and the detecting portion formed on the transparent substrate is disposed on a display side of the display apparatus, since the long sides of the loop coils which serve as the detection conductors are provided so as to cross the predetermined direction (e.g., defined by columns or rows of pixels) in which the display elements of the display apparatus are arrayed, problems associated with a moiré pattern(s) can be prevented. As a result, it is possible to provide the detecting portion of the position detecting apparatus 100 on the display side of the display apparatus with minimal interference patterns. Accordingly, even when the position detecting apparatus 100 is located along the display apparatus, the display apparatus is not restricted from a design standpoint and it is possible to attach the detecting portion of the position detecting apparatus 100 to the assembled display apparatus after manufacturing.

Figure 4:
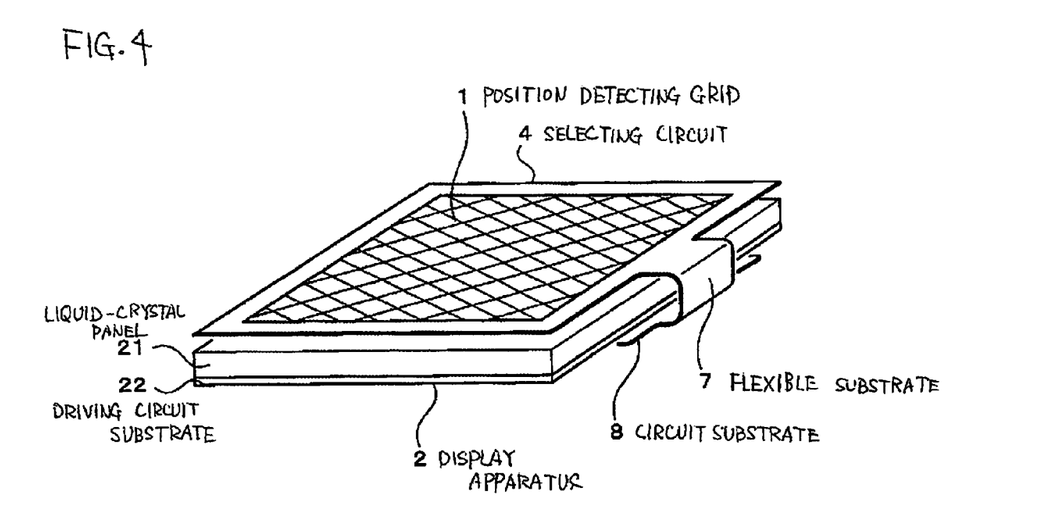
FIG. 4 is a perspective view illustrating a position inputting apparatus according to another embodiment of the present invention.

Further, FIG. 4 is a diagram illustrating a position inputting apparatus according to an embodiment of the present invention. The position inputting apparatus of the present embodiment, as illustrated in FIG. 4, includes a display apparatus 402 and a position detecting grid 401 disposed on a display side of the display apparatus 402. The position detecting grid 401 illustrated in FIG. 4 may be similar to the position detecting grid 1 illustrated in FIG. 1 and may include a selecting circuit 404 to select from a plurality of loop coils in the position detecting grid 401.

The display apparatus 402 includes a liquid-crystal panel 421 and a driving circuit substrate 422, which may be integrally formed as one body. The position detecting grid 401 is provided on the side of the liquid-crystal panel 421 of the display apparatus 402. Additionally, a flexible substrate 407 is provided along with the position detecting grid 401 and extends from the selecting circuit 404. A circuit substrate 408 is disposed on the driving, circuit substrate 422 of the display apparatus 402. The circuit substrate 408 may include components and circuitry of a transmission and reception switching circuit (which may be similar to the transmission and reception switching circuit 5 of FIG. 1) and a control circuit (which may be similar to the control circuit 6 of FIG. 1). The circuit substrate 408 is connected to the position detecting grid 1 through connections in the flexible substrate 407. Additionally, the circuit substrate 408 may be connected to the display apparatus 402 through the driving circuit substrate 422. As can be seen in FIG. 4, the loop coils of the position detecting grid 401 are arranged diagonally with respect to sides of the liquid crystal panel 421.

The position detecting grid 401 may be formed in a transparent substrate such that images formed by the display apparatus 402 can be viewed from the display side even when the position detecting grid 401 is positioned over the display side of the liquid crystal panel 421.

Therefore, in the position inputting apparatus of FIG. 4, the detecting portion (e.g., the position detecting grid 401) of a position detecting apparatus can be attached to the assembled display apparatus 402 after manufacturing.

In addition, since the display apparatus 402 need not be specially designed to accommodate the position detecting apparatus 100 of FIG. 1 and/or the position inputting apparatus of FIG. 4, it is possible to easily design and manufacture the position inputting apparatus and/or the position detecting apparatus 100 of FIG. 1 separately from the display apparatus 402. Also, the display apparatus 402 and the position detecting apparatus 100 (see FIG. 1) can be assembled to operate satisfactorily. In particular, when a plurality of loop coils are located near the display apparatus 402, it is possible to prevent problems associated with interference and moiré patterns from being produced in the display apparatus 402.

Although the display apparatus 402 illustrated in FIG. 4 is described as being the liquid crystal panel 421, it should be understood that other display devices may alternatively be used with the position detecting apparatus 100 illustrated in FIG. 1 and the position inputting apparatus illustrated in FIG. 4 of the present invention.

Figure 5:
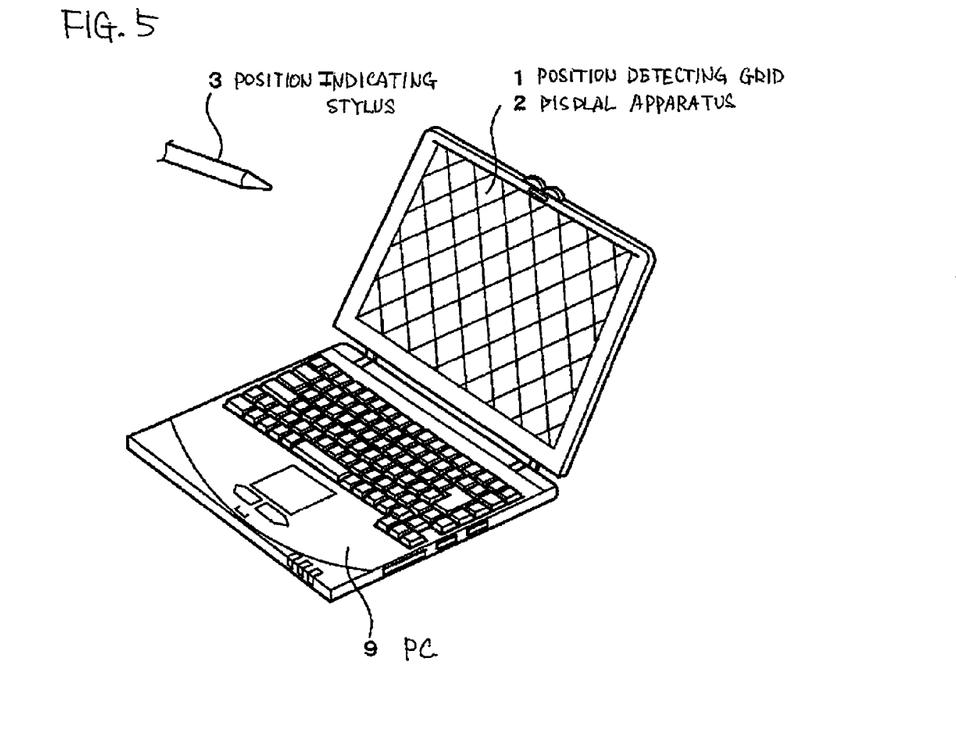
FIG. 5 is a diagram illustrating a computer according to yet another embodiment of the present invention.

FIG. 5 illustrates a computer (PC) 509 according to an embodiment of the present invention. More specifically, FIG. 5 illustrates a lap-top type computer (PC) 509. As illustrated in FIG. 5, a position detecting grid 501 is provided on a display side of a display apparatus 502 which is formed on the computer body 509 that pivots to open and close freely. When a user moves a position indicating stylus 503 to this display apparatus 502 and the position detecting grid 501, the user is able to indicate a position on a screen of the display apparatus 502 and to input information into the computer (PC) 509.

Figure 6:
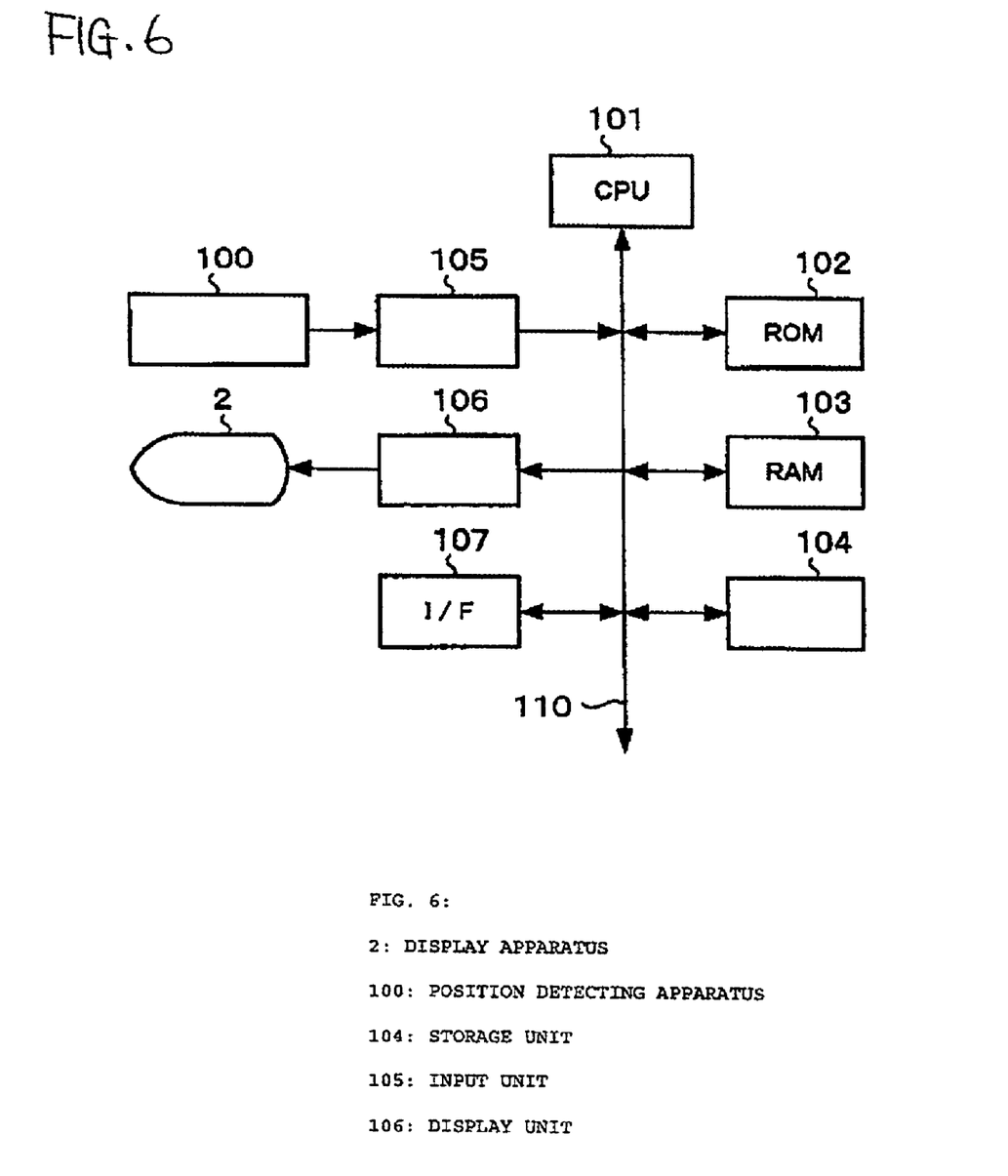
FIG. 6 is a functional block diagram of a computer according to another embodiment of the present invention.

FIG. 6 is a functional block diagram illustrating a computer according to another embodiment of the present invention. As illustrated in FIG. 6, an internal bus 610 is provided to a central processing unit (CPU) 601. A read-only memory (ROM) 602, a random-access memory (RAM) 603, and a storage unit 604 are connected through the internal bus 610 to the central processing unit (CPU) 601. The internal bus 610, the CPU 601, the ROM 602, the RAM 603, and the storage unit 604 may be housed in the computer body 509 (see FIG. 5). Alternatively, these components may be housed in other types of computers or display apparatuses.

For example, after manufacturing the computer body 509 (see FIG. 5) having the internal bus 610, the CPU 601, the ROM 602, the RAM 603, and the storage unit 604 housed therein, a position detecting apparatus 600 is connected through an input unit 605 of the computer to the internal bus 610. The internal bus 610 is connected through the display unit 606 to the display apparatus 602. An interface (I/F) 607 is also connected to the internal bus 610.

When a position indicating stylus (not illustrated in FIG. 6) is moved close to the screen of the display apparatus 602, coordinate information detected by the position detecting apparatus 600 is supplied through the input unit 605 to the internal bus 610. The detected coordinate information is then processed by the central processing unit (CPU) 601 to produce position results in accordance with programs, software instructions, and the like stored in the storage unit 604. Then, processed position results can be provided by the CPU 601 along the internal bus 610 to the display unit 606 to be displayed on the display apparatus 602. As described above, the display apparatus 602 and the position detecting apparatus 600 can be combined to operate in a satisfactory manner and it is possible to prevent problems associated with interference and moiré patterns from being produced on the display apparatus 602.

As described above, the position detecting apparatus is usable with a display apparatus capable of displaying images by changing the states of a plurality of display elements (e.g., pixels) arrayed in a predetermined direction. The position detecting apparatus includes detecting conductors disposed on the display apparatus, and the position detecting apparatus is able to detect the position indicated on the display apparatus. Since the detecting conductors are loop coils having short sides and long sides and are characterized in that the long sides are provided so as to cross the predetermined direction of the display elements, the display apparatus and the position detecting apparatus can be combined to operate in a satisfactory manner without moiré or interference patterns. In particular, when the plurality of loop coils are located close to the display apparatus, it is possible to prevent problems associated with a moiré pattern(s) from being produced on the display apparatus.

Also, the position inputting apparatus described above includes a display apparatus which is capable of displaying images by changing the states of a plurality of display elements (e.g., pixels) arrayed along a predetermined direction. The position inputting apparatus is able to detect a position indicated on the display apparatus using a plurality of detecting conductors disposed on the display apparatus and to input position information. Since the detecting conductors are loop coils having short sides and long sides and are characterized in that the long sides of the loop coils are provided so as to cross the predetermined direction of the display elements, it is possible to prevent problems associated with interference and a moiré pattern(s) from being produced on the display apparatus even when the display apparatus and a position detecting apparatus including the detecting conductors are combined.

Further, the computer described above includes a display apparatus capable of displaying images by changing the states of a plurality of display elements (e.g., pixels) arrayed along a predetermined direction and a position detecting apparatus disposed on the display apparatus which detects a position indicated on the display apparatus. Since detecting conductors disposed on the position detecting apparatus are loop coils having short sides and long sides and are characterized in that the long sides are provided so as to cross the predetermined direction of the display elements, it is possible to prevent problems associated with interference and a moiré pattern(s) from being produced on the display apparatus even when the display apparatus and the position detecting apparatus are combined.

Although a few embodiments of the present invention have been shown and described, it will be appreciated by those skilled in the art that changes may be made in these embodiments without departing from the principles and spirit of the general inventive concept, the scope of which is defined in the appended claims and their equivalents.

What is claimed is:

1. A position detecting apparatus, comprising:
  a display apparatus having a screen for displaying images by changing states of a plurality of display elements, the display elements arranged in an X-Y array in horizontal and vertical directions; and
  at least one detecting conductor disposed on said display apparatus to detect a position indicated on said display apparatus, said at least one detecting conductor including a loop coil having short sides and long sides, the long sides of said loop coil being obliquely arranged with respect to the horizontal and vertical directions of the X-Y array of said display elements.

2. The position detecting apparatus according to claim 1, wherein said short sides of said at least one detecting conductor are located outside a screen of said display apparatus.

3. The position detecting apparatus according to claim 1, wherein said loop coil comprises a plurality of loop coils being disposed along a display side of the display apparatus.

4. The position detecting apparatus according to claim 3, wherein said plurality of loop coils have wirings which form the long sides of said at least one detecting conductor, said wirings being disposed at equal intervals on a screen of said display apparatus.

5. The position detecting apparatus according to claim 3, wherein said plurality of loop coils are disposed on said screen of said display apparatus in an overlapping fashion.

6. The position detecting apparatus according to claim 3, wherein said plurality of loop coils are formed of multiple wirings, each of said loop coils being formed of a plurality of turns, and said multiple wirings forming the long sides of said loop coils disposed on said screen of said display apparatus and being spaced at equal intervals.

7. The position detecting apparatus according to claim 3, further comprising:
  an indicating device to indicate said position on the display apparatus, said indicated position being detected by selecting at least one of said loop coils, transmitting transmission signals from said selected loop coils to said indicating device and calculating levels of said transmission signals received by said indicating device.

8. The position detecting apparatus according to claim 3, further comprising:
  an indicating device to indicate said position on the display apparatus, said indicated position being detected by transmitting transmission signals from said indicating device to said plurality of loop coils and calculating levels of said transmission signals received from said indicating device by each of said plurality of loop coils.

9. The position detecting apparatus according to claim 3, further comprising:
  an indicating device to indicate said position on the display apparatus, said indicated position being detected by selecting ones of said loop coils to transmit first transmission signals to said indicating device, transmitting second transmission signals from said indicating device to said plurality of loop coils in response to said first transmission signals, and calculating levels of said second transmission signals received by each of said plurality of loop coils from said indicating device.

10. The position detecting apparatus according to claim 3, wherein said plurality of loop coils includes a first loop coil group and a second loop coil group, the long sides of said first and second loop coil groups crossing each other and crossing the predetermined direction of said display elements.

11. A position inputting apparatus, comprising:
  a display apparatus having a screen for displaying images by changing states of a plurality of display elements, the display elements arranged in an X-Y array in horizontal and vertical directions; and
  at least one detecting conductor disposed on said display apparatus to detect a position indicated on said display apparatus and to input position information, said at least one detecting conductor including a loop coil having short sides and long sides, the long sides of said loop coil being obliquely arranged with respect to the horizontal and vertical directions of the X-Y array of said display elements.

12. A computer, comprising:

a display apparatus having a screen for displaying images by changing states of a plurality of display elements, the display elements arranged in an X-Y array in horizontal and vertical directions; and a position detecting apparatus disposed on said display apparatus to detect a position indicated on said display apparatus and having at least one detecting conductor disposed on said display apparatus including a loop coil having short sides and long sides, the long sides of said loop coil being obliquely arranged with respect to the horizontal and vertical directions of the X-Y array of said display elements.

13. A position detecting apparatus, comprising:

a display panel having a rectangular screen with a plurality of pixels, the pixels arranged in an X-Y array in horizontal and vertical directions; and a position input device being removably coupled with said display panel, said position input device including a position detecting grid disposed on said screen of said display panel and having a plurality of elongated conductors spaced apart from each other and extending diagonally with respect to the horizontal and vertical directions of the X-Y array of the display panel, a coupling part to removably couple said position detecting grid to said display panel, and a control part to control said position detecting grid to detect a position indicated on said screen.

14. The position detecting apparatus according to claim 13, further comprising:

an indicating device to interact with said elongated conductors of said position detecting grid via electromagnetic signals such that said control part determines a position of the indicating device with respect to said position detecting grid based on levels of signals being communicated between the indicating device and said elongated conductors.

15. The position detecting apparatus according to claim 14, wherein said indicating device comprises a stylus having a resonance circuit that generates a resonant signal based on a transmission signal received from said position detecting grid such that said control part detects said position of said indicating device with respect to said position detecting grid by reading said resonance signal from said indicating device.

16. The position detecting apparatus according to claim 14, wherein said indicating device comprises a stylus having a resonance circuit that generates a resonant signal and transmits said resonant signal to said position detecting grid such that said control part detects said position of said indicating device with respect to said position detecting grid by reading said resonant signal received at said position detecting grid.

17. The position detecting apparatus according to claim 14, wherein said control part sequentially selects ones of said elongated conductors to communicate with said indicating device, compares the levels of signals communicated via said selected elongated conductors, and determines that an elongated conductor associated with a communication signal having the highest level is the elongated conductor closest to said indicating device.

18. The position detecting apparatus according to claim 13, further comprising:

an indicating part movable along said position detecting grid, the indicating part communicating with said elongated conductors such that a plurality of signals are communicated between corresponding elongated conductors and the indicating part, wherein said control part determines which one of said elongated conductors is closest to said indicating part based on a comparison of said communication signals corresponding to said elongated conductors.

19. The position detecting apparatus according to claim 18, wherein said control part determines said closest elongated conductor by selecting the elongated conductor corresponding to the highest signal level.

20. The position detecting apparatus according to claim 18, wherein the control part further determines which of the pixels is closest to said indicating part based on a position of said closest elongated conductor.

21. The position detecting apparatus according to claim 20, wherein said elongated conductors comprise a plurality of loop coils having long sides extending diagonally with respect to said lengthwise and widthwise axes of said screen.

22. The position detecting apparatus according to claim 20, wherein said elongated conductors comprise a plurality of loop coils having a trapezoidal shape.

23. The position detecting apparatus according to claim 13, wherein said control part comprises a detector connected to said position detecting grid to detect electromagnetic signals being received by said elongated conductors.

24. The position detecting apparatus according to claim 13, further comprising:

an indicating device movable with respect to said position detecting grid to transmit and receive electromagnetic signals to and from said elongated conductors of said position detecting grid; and a transmission and reception switching circuit to switch operation of said position detecting grid between a transmitting mode in which said elongated conductors transmit electromagnetic signals to said indicating device and a receiving mode in which said elongated conductors receive electromagnetic signals from said indicating device.

25. The position detecting apparatus according to claim 13, wherein said elongated conductors extend diagonally between pairs of adjacent pixels.

26. A computer, comprising:

a display pane to display images on a display side thereof, the display panel comprising display elements arranged in an X-Y array;

a central processing unit to control said display panel;

a position detecting apparatus, including, a rectangular position detecting grid coupled to said display side of said display panel having at least first and second groups of elongated conductor extending diagonally with respect to the X-Y array of said display elements in first and second directions, respectively, and a control part to determine a position of a movable indicator with respect to said position detecting grid based on communication signals exchanged between said elongated conductors and said movable indicator; and an input part to receive said determined position of said movable indicator from said control part of the position detecting apparatus and to provide said determined position to said central processing unit.

27. A method for detecting a position of a movable indicator with respect to a display apparatus having a rectangular screen, the method comprising;

providing a position detecting grid on a display side of said display apparatus, said display apparatus comprising display elements arranged in an X-Y array, said position detecting grid having a plurality of elongated conductors spaced apart from each other and extending diagonally with respect to the X-Y array of said display elements of said display apparatus;

controlling said elongated conductors to exchange communication signals with said movable indicator; and determining an elongated conductor closest to said movable indicator based on comparison of communication signals exchanged by corresponding elongated conductors.

28. The method according to claim 27, wherein said display apparatus comprises a plurality of pixels, and the method further comprises: determining at least one pixel of said display apparatus to which said movable indicator is closest based on a position of said closest elongated conductor.

29. The method according to claim 27, wherein said controlling of said elongated conductors comprises sequentially selecting said elongated conductors to exchange signals with said movable indicator.

* * * * *